US008386844B2

(12) United States Patent
Jones et al.

(10) Patent No.: US 8,386,844 B2
(45) Date of Patent: Feb. 26, 2013

(54) SELF-REPAIRING ELECTRONIC DATA SYSTEM

(75) Inventors: David Huw Jones, Durham (GB); Alan Purvis, Durham (GB); Richard Peter McWilliam, Durham (GB)

(73) Assignee: University of Durham, Durham (GB)

( * ) Notice: Subject to any disclaimer, the term of this patent is extended or adjusted under 35 U.S.C. 154(b) by 0 days.

(21) Appl. No.: 12/865,938

(22) PCT Filed: Feb. 9, 2009

(86) PCT No.: PCT/GB2009/050125
§ 371 (c)(1),
(2), (4) Date: Aug. 3, 2010

(87) PCT Pub. No.: WO2009/098521
PCT Pub. Date: Aug. 13, 2009

(65) Prior Publication Data
US 2011/0004787 A1  Jan. 6, 2011

(30) Foreign Application Priority Data
Feb. 7, 2008 (GB) .................................. 0802245.1

(51) Int. Cl.
*G06F 11/20* (2006.01)
*G06N 5/02* (2006.01)
(52) U.S. Cl. ..................... 714/11; 714/E11.072; 706/47
(58) Field of Classification Search .................. None
See application file for complete search history.

(56) References Cited

U.S. PATENT DOCUMENTS 4,769,644 A    9/1988  Frazier
6,014,509 A *  1/2000  Furtek et al. ..................... 326/41
6,215,327 B1 * 4/2001  Lyke .............................. 326/41

OTHER PUBLICATIONS

International Search Report and Written Opinion dated Jun. 17, 2009 in connection with PCT/GB2009/050125.
Masataka Kawanaka et al: "A Fault-Tolerant Parallel Processor Modeled by a Two-Dimensional Linear Cellular Automaton"; Systems & Computers in Japan, Wiley, Hoboken, NJ, US; vol. 25, No. 6, Jun. 1, 1994; pp. 1-11; XP000476986; ISSN: 0882-1666.
Kamiura N. et al: "A repairable and diagnosable cellular array on multiple-valued logic"; Proceedings of the International Symposium on Multiple Valued Logic, Sacramento, May 24-27, 1993; [Proceedings of theInternational Symposium on Multiple Valued Logic[, Los Alamitos, IEEE Comp. Soc. Press, US; vol. Symp. 23, May 24, 1993; pp. 92-97; XP010094812; ISBN: 978-0-8186-3350-8.
Search Report dated Jun. 29, 2008 in connection with UK Application GB0802245.1.

* cited by examiner

*Primary Examiner* — Crystal L Hammond
(74) *Attorney, Agent, or Firm* — Quarles & Brady LLP

(57) ABSTRACT

An array of logic devices capable of self-determining the program, inputs and outputs from configuration information provided by its nearest neighbors. The rules used by each device to self-determine its behavior are identical to those of every other device in the array. This facilitates the development of robust array configurations and robust behavior of the device as a whole. This system's logic devices utilize three shift-registers, two are programmed before operation, the third is programmed on-the-fly by the other two. This facilitates a fast response to changes in the performance of the array in the event of partial dynamic or static failures of the array. An iterative design algorithm for the array ensures optimum use of the resources of the array.

21 Claims, 12 Drawing Sheets

Convergent cellular automata

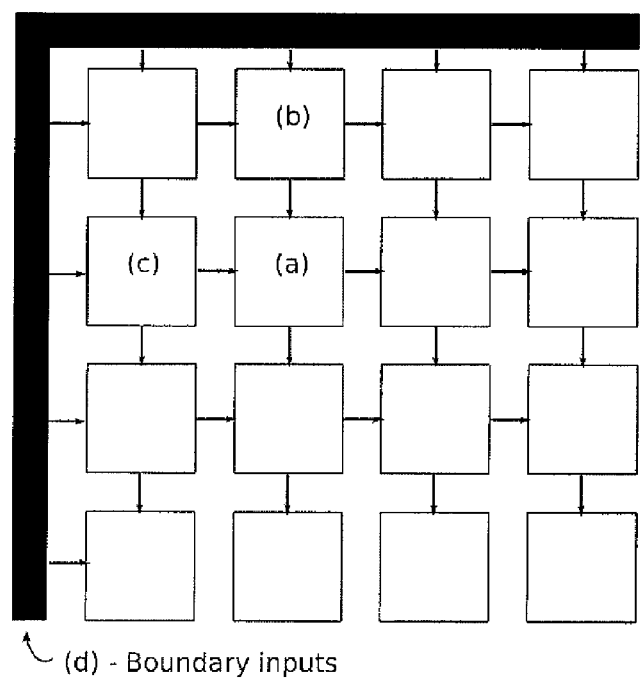
Figure 1: Convergent cellular automata

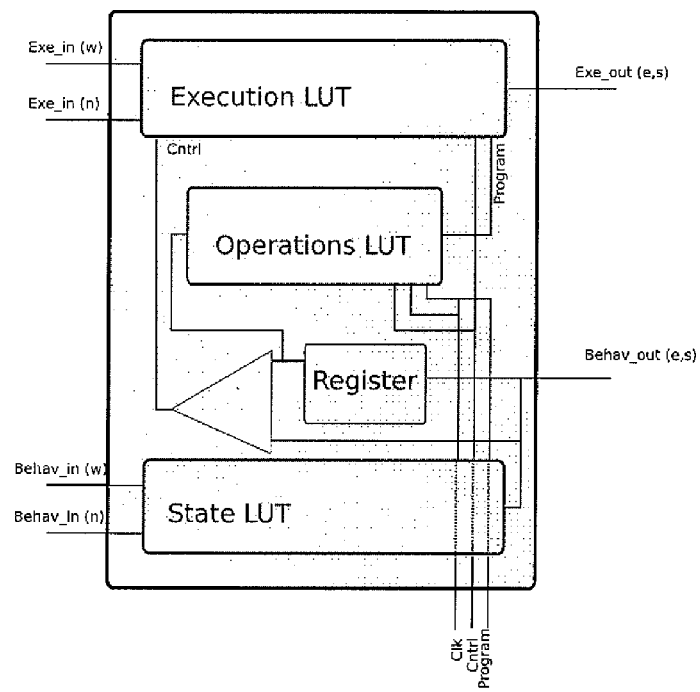
Figure 2: Internal cell logic

| Above in | Left in | Out |
|---|---|---|
| 0 | 0 | 1 |
| 0 | 1 | 2 |
| 0 | 2 | 3 |
| 0 | 3 | 4 |
| 1 | 0 | 8 |
| 1 | 7 | 8 |
| 2 | 6 | 7 |
| 2 | 8 | 7 |
| 3 | 5 | 6 |
| 3 | 7 | 6 |
| 4 | 0 | 5 |
| 4 | 6 | 5 |
| 5 | 2 | 1 |
| 6 | 3 | 2 |
| 7 | 4 | 3 |
| All other combinations | | 0 |

Figure 3: Example look-up table rules

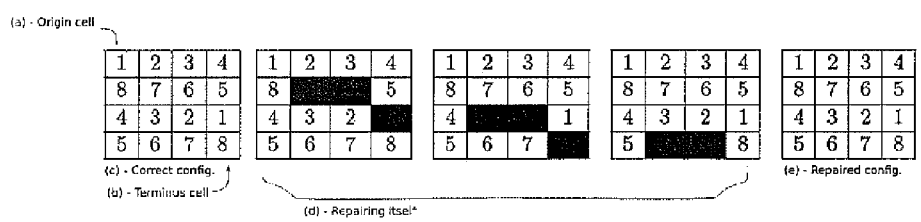
Figure 4: Cellular automata self-repair example

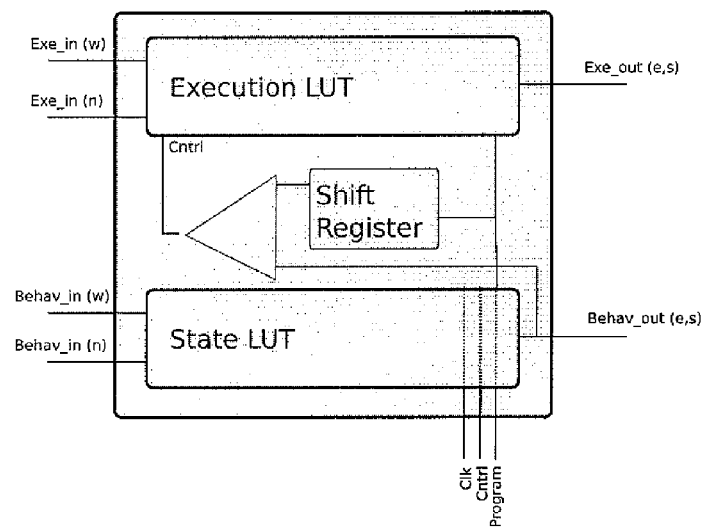
Figure 5: Internal logic (embodiment 2)

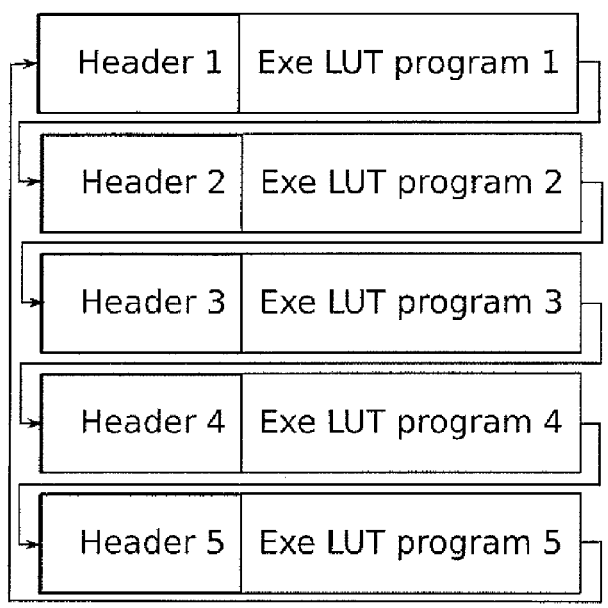
Figure 6: Example program bitstream (embodiment 2)

For (each cell, from the bottom-right corner to the top-left, in a ascending diagonal sequence){

Set cell state = 0

While(no solution found) {

Test cell state and cell function against
previous assignments, as each configuration can only have
one cell function to which it maps.

If a contradiction exists, no solution has been found.

The cell state assignment, and that of the cell
to the north-east will form the inputs to the state LUT rule that
determines the function output value of
the cell to the east.

If this rule contradicts existing rules, no solution has been
found.

If a solution has been found populate the rule and assignment tables.

}
}

Figure 7: An algorithm for generating morphogenesis look-up tables with output mappings:

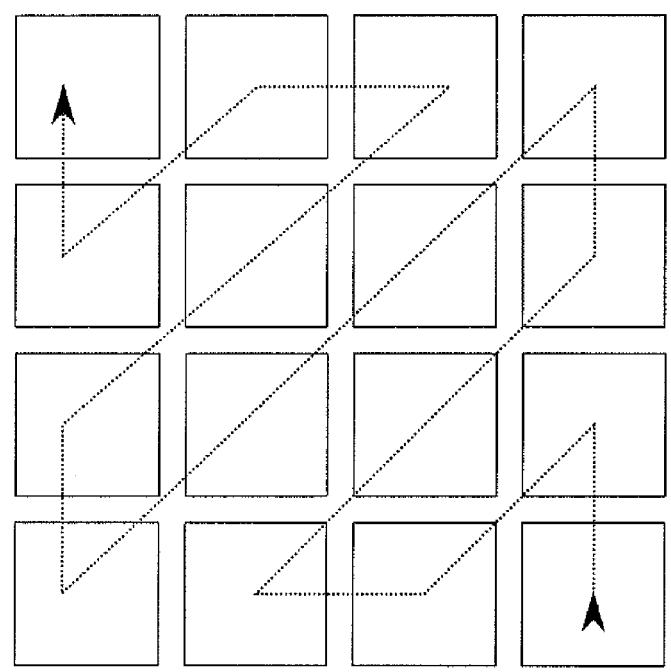
Figure 8: Iteration route

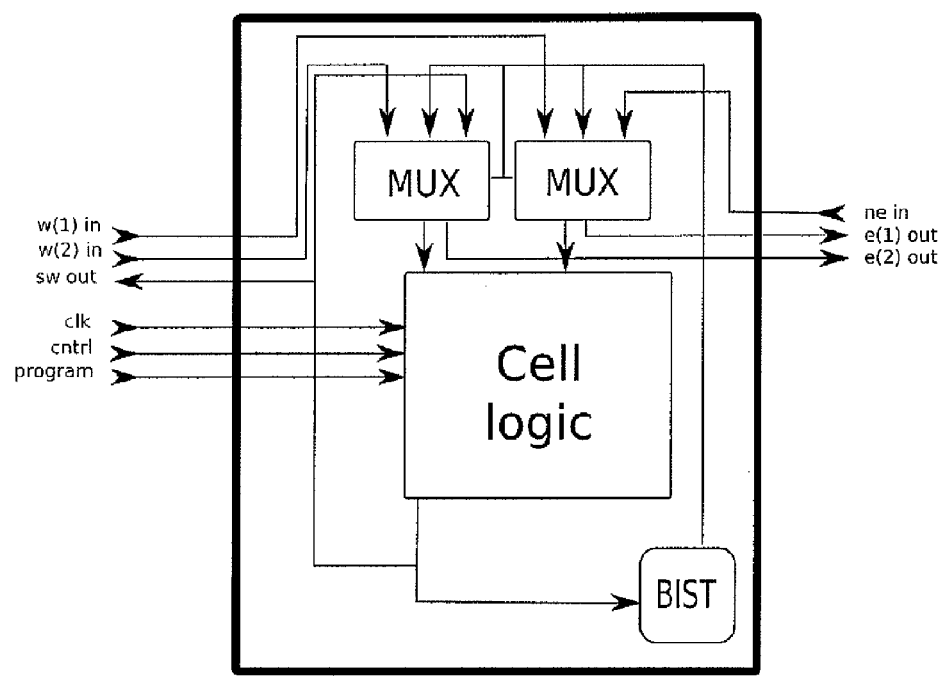
Figure 9: Cell routing configuration

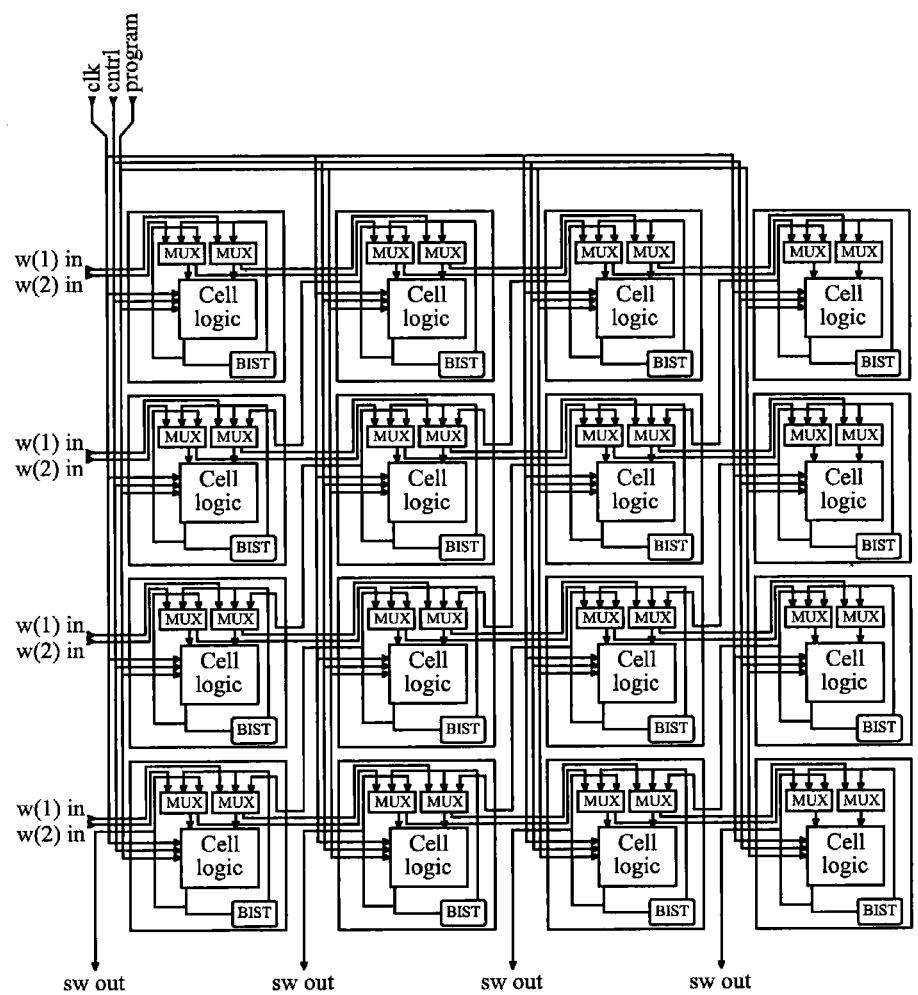
Figure 10: Cell array

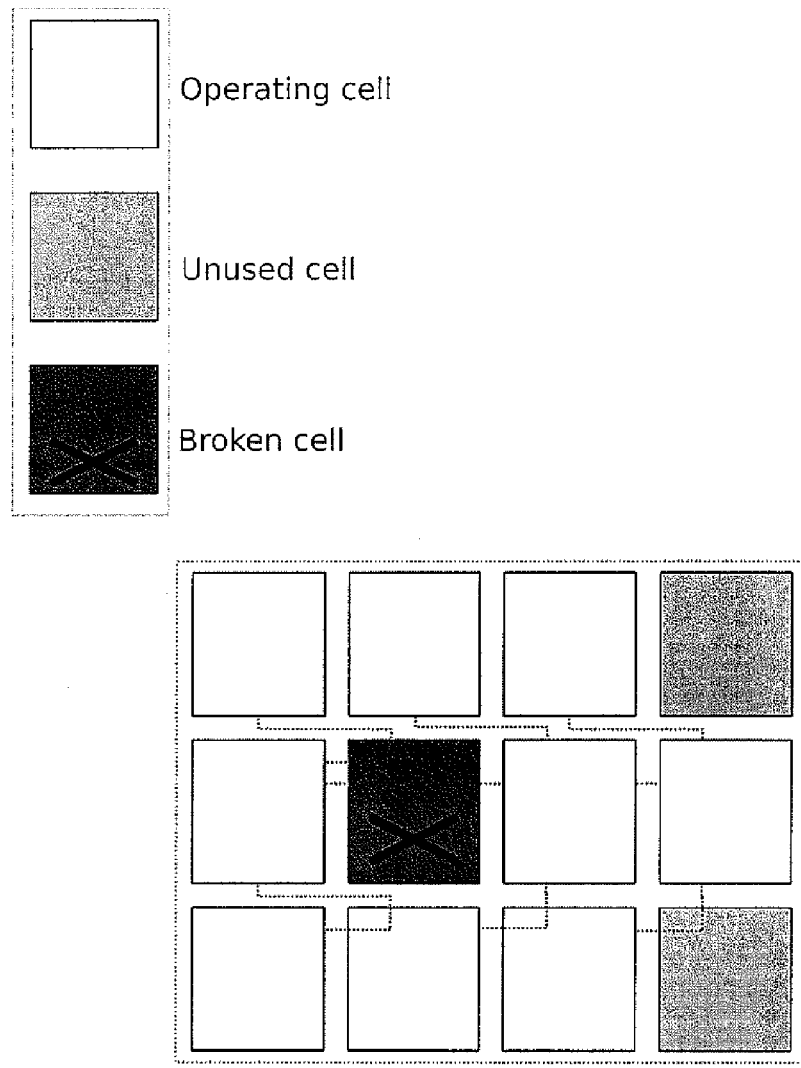
Figure 11: Cell repair

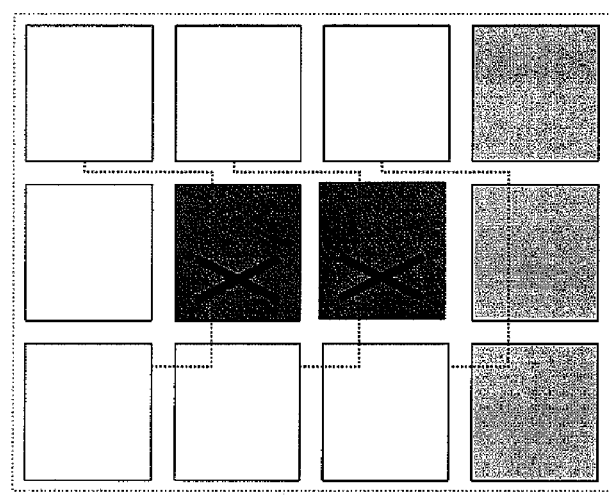
Figure 12: Cell repair

SELF-REPAIRING ELECTRONIC DATA SYSTEM

CROSS REFERENCE TO RELATED APPLICATIONS

This application represents the national stage application of International Application PCT/GB2009/050125 filed 9 Feb. 2009, which claims priority of Great Britain Patent Application No. 0802245.1 filed 7 Feb. 2008, which are incorporated herein by reference in their entirety for all purposes.

The present invention relates to the field of cellular-automata, bio-imitation and fine-grained self-reconfigurable hardware. In particular it mimics the biological repair mechanism "morphogenesis". More particularly it uses a convergent cellular-automaton as the means of determining the behaviour of each cell with respect to a program for the whole device.

INTRODUCTION

Reconfigurable devices are a combination of the flexibility of software with the performance of hardware. They are useful for rapid-prototyping and in-situ reprogramming. However their programmed elements are susceptible to transient faults, thus limiting their potential arenas of operation. Also the necessity for long-distance communications makes them susceptible to permanent system faults.

Cellular automata are systems in which space and time are discrete. Typically they take the form of an array of independent logic blocks that perform calculations based on inputs from their nearest neighbours.

Cellular automata, such as that disclosed by U.S. Pat. No. 6,297,667, have been used as the basis of self-reconfigurable hardware before. However their use within this context has so far just been to remove the dependency of reconfigurable hardware on long distance busses. The present invention uses a specific cellular automata architecture that ensures the design will always converge on a specific configuration.

The biological approach to assembling reliable systems is to rely on cell-to-cell communications to co-ordinate the reconfiguration of cells when damage necessitates the repair. By imitating this approach a reconfigurable device arranged as a cellular automata can benefit from the advantageous reliability demonstrated by biology.

However the difficulties of designing cellular-automata to converge to a particular fixed configuration have prevented this approach from any practical applications. Thus the design of convergent cellular-automata from the device program requires a design algorithm particular to this device configuration.

SUMMARY OF THE INVENTION

The present invention relates to logical hardware which can restore itself to a working state in the presence of transient and permanent failure. Particular advantage arises from the resulting methods for implementing self-test and repair which have enormous potential to systems that operate in hazard-prone environments or on failure-prone hardware. One example is systems operating outside the natural protection from solar radiation provided by the atmosphere of the earth. Space-based electronic systems are prone to high soft-error rates caused by solar radiation; the hardware platform proposed in this document would be tolerant of such failure modes. Another example is hardware that is assembled on plastic substrates instead of the more normal silicon. This substrate is prone to stretching and tearing; the hardware platform that is described herein would be tolerant of such substrate deformations.

Accordingly, several objects and advantages of the present invention are:

to provide a reconfigurable hardware platform that demonstrates robust behaviour in the presence of dynamic and permanent system faults;

to provide a cell structure whereby each cell is capable of self-determining function from the function of its neighbours;

to provide a reconfigurable parallel processing architecture capable of processing data according to a previously defined program;

to provide a means of tolerating dynamic faults and preventing cascade failures;

to provide a means of dynamically managing redundant cells for the repair of permanent faults;

to provide a design algorithm for the rapid design of large-scale program implementations specific to this platform.

Viewed from a first aspect, the invention provides a method to eradicate the problem of transient faults in silicon computing device by the use of cellular automata which perpetually converge on a fault-free state.

Viewed from a further aspect, the complexity of each cell is reduced to comparing its state inputs with those encapsulated in a serially transmitted bitstream.

Viewed from a still further aspect, the automaton is used to generate software that is immune from corruption for execution by an external processor.

According to an aspect of the present invention, there is provided a data processing apparatus, comprising a plurality of first data processing cells, wherein (i) each said first data processing cell is adapted to store data corresponding to a state value representing a property of the cell, (ii) the apparatus is adapted to repeatedly update the state value of each said first data processing cell in dependence on the respective state value of at least one predetermined other said first data processing cell, in accordance with a first set of rules, (iii) each cell follows the same said first set of rules, and (iv) the first set of rules is determined by predetermined final state values of a plurality of said first data processing cells, such that repeated updates of the state values of the plurality of first data processing cells cause the state values of said plurality of first data processing cells to converge towards said predetermined final state values, independently of the initial state values of said first data processing cells.

The advantage of the present invention is that the processing apparatus is able to recover from transient faults. The state value of each said first data processing cell is successively updated according to the state values of other, for example neighbouring, first data processing cells, such that the apparatus will self-correct to the predetermined final state values after a sufficient number of iterations of the updating process. The apparatus converges to the same predefined configuration regardless of the initial state, so can recover from transient faults affecting 100% of the cells. A further advantage is that the apparatus can be reconfigured to a different final state by supplying a new set of rules.

The respective state value of a plurality of said first data processing cells may be updated independently of the state value of said each cell.

The apparatus may be adapted to update the state values of a plurality of said first data processing cells such that, if the state value of a first said cell is updated in dependence on the state value of a second said cell, the state value of the second said cell is updated independently of the state value of the first said cell.

This provides the advantage of ensuring that the system always converges towards the predetermined final state values.

The apparatus may further comprise at least one second data processing cell, wherein the apparatus is adapted to update the state value of the or each said second data processing cell in dependence on at least one constant value, and to update the state value of at least one respective said first data processing cell in dependence on the state value of said second data processing cell.

Advantageously, this allows the apparatus to be reconfigured to a different final state by changing the values used to update the second data processing cells. A complete system reload can be triggered by changing the inputs of the second data processing cells to another value, then returning them to an initial value at the next clock cycle.

Two or more said first and/or second data processing cells may be adapted to have the same state value.

Advantageously, by allowing multiple cells to have the same state value, the number of state values required is reduced.

In a preferred embodiment, the respective state value of a plurality of said first data processing cells is updated in accordance with a respective output state value obtained by applying the first set of rules to one or more input state values of respective predetermined other said first and/or second data processing cells, wherein one configuration of input state values always determines the same output state value, and wherein two or more different configurations of input state values determine the same output state value.

Advantageously, by allowing more than one configuration of input states to map to the same output state, the total number of different state values required for a given number of cells is minimized.

The first set of rules may be represented as a look-up table.

The first set of rules may be pre-programmed in a plurality of said first and/or second data processing cells.

A plurality of said first and/or second data processing cells may be adapted to receive the first set of rules from an external source.

A respective said state value of a plurality of said first and/or second data processing cells in use may represent a respective function to be executed by said cell having that state value, in accordance with a second set of rules.

Introducing both a state value and a function for each cell advantageously allows a convergent solution to be found for a wider range of cell configurations.

Two or more different state values in use may represent the same function.

The second set of rules may be pre-programmed in a plurality of said first and/or second data processing cells.

A plurality of said first and/or second data processing cells may be adapted to execute computer code corresponding to a respective function of said cell, the computer code being received from an external source.

A plurality of said first and/or second data processing cells may be adapted to receive said code for said function prefixed by a header including at least one respective state value representing said function, and said cell is adapted to select the code to be executed by comparing the or each state value in the header to the state value of the cell.

Advantageously, each cell need only read the code required for its current function. If the cell is reconfigured to have a different state value, the code may be updated to correspond to the new function of the cell.

A plurality of said first and/or second said data processing cells may be adapted to receive said code for said function prefixed by a header including:

at least one respective output state value which represents said function according to the second set of rules, and at least one set of input state values which determines said output state value according to the first set of rules;

wherein said cell in use selects the code to be executed by comparing the input state values to the state values received from predetermined other cells, and updates the state value of the cell according to the respective output state value.

Advantageously, the cell determines it obtains its updated state value and the code required to implement its function in one step. There is therefore no need for each cell to store the function code or the first or second sets of rules.

The code for each function may be repeatedly transmitted to each cell.

The code may comprise a bitstream to be executed as a look-up table.

A plurality of said first and/or second said data processing cells may be adapted to communicate only with adjacent cells.

A plurality of said first and/or said second data processing cells may be identical to each other.

Said first and/or second data processing cells may be interconnected in an array.

The array may be a planar rectangular array.

State values may be transmitted between cells in a single sense along each axis and/or diagonal of the array.

The first set of rules may be represented as an upper-diagonal or lower-diagonal matrix.

A plurality of said first data processing cells may be interconnected in rows, wherein a plurality of said rows each comprise at least one unused cell, and wherein, in the event of failure of a said cell, the inputs and outputs of a plurality of cells in that row are displaced along the row to activate at least one said unused cell.

The change in connections between the cells automatically triggers a new calculation of the cell state and assigned function by each cell shifted by the operation. Thus the state value and function of the cells between the fault and the unused cell are all shifted along to an adjacent cell. Advantageously, this ensures that the apparatus can replace one cell in every row with an unused cell on the same row.

In a preferred embodiment, a plurality of said first data processing cells are interconnected in rows, and at least one said row comprises a row of unused cells, wherein, in the event of failure of a said cell in one row, the inputs or outputs of the cells in that row are shifted to the next row.

Advantageously, if a fault occurs in a row in which there is no spare cell available, the functions of the cells in that row can be shifted to the next row. Successive updates of the state values of the cells will propagate the functions of each successive row to the next. This ensures that the apparatus can replace entire rows of faulty cells with unused rows of cells in the apparatus.

The inputs and outputs of cells may be shifted by means of multiplexers.

According to another aspect of the present invention, there is provided a method of configuring a data processing apparatus as defined above, the method comprising:

assigning a state value to a first data processing cell of the apparatus;

testing the state value of said cell, and the respective state value of each other said first data processing cell in dependence on which the state value of said cell is adapted to be repeatedly updated, against previously determined rules; and if a previously determined rule updates the cell to a different state value based on the state values of the other cells, assigning a different state value to said cell.

The method may further comprise testing the state value of said cell and a predefined function of said cell against previous state value to function mappings, and, if that state value has previously been mapped to a different function, assigning a different state value to the cell.

In a preferred embodiment, a new state value is assigned to a cell only after all state values previously assigned to other cells have been unsuccessfully tested.

Advantageously, this method allows the number of state values assigned to the cells, and therefore the number of rules, to be minimized. The advantage is that the set of rules is more efficient.

The method may further comprise mapping a state value to a function to be performed by the cell, such that all cells having the same state value perform the same function.

According to a further aspect of the present invention, there is provided a data processing method executed by a data processing apparatus as defined above, the method comprising repeatedly updating the state value of each of a plurality of said first data processing cells in dependence on the respective state value of at least one predetermined respective other said first data processing cell, in accordance with a first set of rules, wherein each cell follows the same said first set of rules, and the first set of rules is determined by predetermined final state values of a plurality of said first data processing cells, such that repeated updates of the state values of the plurality of first data processing cells causes the state values of said plurality of first data processing cells to converge towards said predetermined final state values, independently of the initial state values of said first data processing cells.

The method may further comprise updating the state values of a plurality of said first data processing cells such that, if the state value of a first said cell is updated in dependence on the state value of a second said cell, the state value of the second said cell is updated independently of the state value of the first said cell.

The method may further comprise updating the state value of the or each said second data processing cell in dependence on at least one constant value, and updating the state value of at least one respective said first data processing cell in dependence on the state value of said second data processing cell.

The method may further comprise implementing the first set of rules as a look-up table.

The method may further comprise pre-programming the first set of rules in a plurality of said first and/or second data processing cells.

The method may further comprise receiving the first set of rules from an external source.

The method may further comprise representing, by means of a said state value of a plurality of said first and/or second data processing cells, a respective function, to be executed by said cell having that state value, in accordance with a second set of rules.

The method may further comprise pre-programming the second set of rules in a plurality of said first and/or second data processing cells.

The method may further comprise receiving, from an external source, computer code to be executed by a plurality of said first and/or second data cells and corresponding to a respective functions of said cells.

The method may further comprise repeatedly transmitting to a plurality of said first and/or second data processing cells the code for each function.

The method may further comprise representing the first set of rules as an upper-diagonal or lower-diagonal matrix.

In a preferred embodiment, a plurality of said first data processing cells are interconnected in rows, a plurality of said rows each comprise at least one unused cell, and the method further comprises, in the event of failure of a said cell, displacing the inputs and outputs of a plurality of cells in that row along the row to activate at least one said unused cell.

In a preferred embodiment, a plurality of said first data processing cells are interconnected in rows, at least one said row comprises a row of unused cells, and the method further comprises, in the event of failure of a said cell in one row, shifting the inputs or outputs of the cells in that row to the next row.

According to a further aspect of the present invention, there is provided a computer program product executable by a computer to carry out a method as defined above, the computer program comprising:

first computer code for assigning a state value to a first data processing cell of the apparatus;

second computer code for testing the state value of said cell, and the respective state value of each other said first data processing cell in dependence on which the state value of said cell is adapted to be repeatedly updated, against previously determined rules; and third computer code for assigning a different state value to said cell if a previously determined rule updates the cell to a different state value based on the state values of the other cells.

The computer program product may further comprise:

fourth computer code for testing the state value of said cell and a predefined function of the cell against previous state value to function mappings; and fifth computer code for assigning a different state value to the cell, if that state value has previously been mapped to a different function.

The computer program product may further comprise sixth computer code for assigning a new state value to a cell only after all state values previously assigned to other cells have been unsuccessfully tested.

The computer program product may further comprise seventh computer code for mapping a state value to a function to be performed by the cell, such that all cells having the same state value perform the same function.

According to a further aspect of the present invention, there is provided a computer program product executable by computer to carry out a method as defined above, the computer program product comprising eighth computer code for repeatedly updating the state value of each of a plurality of said first data processing cells in dependence on the respective state value of at least one predetermined respective other said first data processing cell, in accordance with a first set of rules, wherein each cell follows the same said first set of rules, and the first set of rules is determined by predetermined final state values of a plurality of said first data processing cells, such that repeated updates of the state values of the plurality of first data processing cells causes the state values of said plurality of first data processing cells to converge towards said predetermined final state values, independently of the initial state values of said first data processing cells.

The computer program product may further comprise ninth computer code for updating the state values of a plurality of said first data processing cells such that, if the state value of a first said cell is updated in dependence on the state value of a second said cell, the state value of the second said cell is updated independently of the state value of the first said cell.

The computer program product may further comprise tenth computer code for updating the state value of the or each said second data processing cell in dependence on at least one constant value, and eleventh computer code for updating the state value of at least one respective said first data processing cell in dependence on the state value of said second data processing cell.

The computer program product may further comprise twelfth computer code for implementing the first set of rules as a look-up table.

The computer program product may further comprise thirteenth computer code for pre-programming the first set of rules in a plurality of said first and/or second data processing cells.

The computer program product may further comprise fourteenth computer code for receiving the first set of rules from an external source.

The computer program product may further comprise fifteenth computer code for representing, by means of a said state value of a plurality of said first and/or second data processing cells, a respective function, to be executed by said cell having that state value, in accordance with a second set of rules.

The computer program product may further comprise sixteenth computer code for pre-programming the second set of rules in a plurality of said first and/or second data processing cells.

The computer program product may further comprise seventeenth computer code for receiving, from an external source, computer code to be executed by a plurality of said first and/or second data cells and corresponding to respective functions of said cell.

The computer program product may further comprise eighteenth computer code for repeatedly transmitting to each cell the code for each function.

The computer program product may further comprise nineteenth computer code for representing the first set of rules as an upper-diagonal or lower-diagonal matrix.

In a preferred embodiment, a plurality of said first data processing cells are interconnected in rows, wherein a plurality of said rows each comprise at least one unused cell, and the computer program product further comprises twentieth computer code for displacing the inputs and outputs of a plurality of cells in that row along the row to activate at least one said unused cell, in the event of failure of a said cell.

In a preferred embodiment, a plurality of said first data processing cells are interconnected in rows, and at least one said row comprises a row of unused cells, and the computer program product further comprises twenty first computer code for shifting the inputs or outputs of the cells in that row to the next row, in the event of failure of a said cell in one row.

According to a further aspect of the present invention, there is provided a method to eradicate the problem of transient faults in silicon computing device by the use of cellular automata which perpetually converge on a fault-free state.

The method may create a pre-defined convergent rule set which can be implemented on an array of identical processing cells as part of a larger fine-grained architecture that define the interactions of each cell with its adjoining neighbour(s).

The automata as recited may be an array of identical cells. Each cell consisting of programmable logic in the form of an array where each cell has at least one neighbour.

In a preferred embodiment, cell only communicates with its immediate neighbour(s) and passes information on in a consistent direction. Such that if two or more neighbours determine the state of a cell then the resolved orthogonal directions of information flow must not oppose.

The bi-directional arrangement of having at least two-in, two-out may ensure the platform converges by the application of an iterative transition function which is uniquely defined by the automata end state.

Each cell may determine its cell state according to at least one nearest neighbour which is embodied by implementing an identical pre-programmed look-up table in each cell.

The behaviour of the cell network may be mapped on to hardware such that the converged status of the cell network creates a converged hardware solution. This transfers the self restoring properties of the algorithm to the hardware implementation.

The role of each cell within the computing device may be determined from the previously calculated cell state and a look-up table, such that many cell states can map to one role. This transfers self-restoring properties of the convergent automata to the computing device and allows the automata itself to become the computing device.

The code responsible for implementing the role of each cell may be prefixed with a header that is made up of the corresponding cell state inputs and output of the cells that will execute it, the concatenated code-header pairs then repeatedly transmitted to each cell.

In a preferred embodiment, each cell selects the code it will execute from the transmitted code-header pairs by comparing the header input values to the cell state information received by the cell from its neighbours. Also selected from the header is the output of the cell that describes its cell state to its neighbours.

The iterative transition function that uniquely defines the automata end state may be written by a design algorithm particular to the architecture. This algorithm assigns cell state to cell roles with a many-to-one mapping such that a minimum number of cell states are necessary.

The platform design algorithm may test the cell state inputs and output of each cell against previous cell input/output combinations. No two cells can have the same inputs and different outputs, so in the event of a contradiction a different cell state is assigned to the latter cell. Every previously assigned cell state is tested prior to assigning a new behaviour label.

The platform design algorithm may test the cell state and role of each cell against previous state/role combinations. No two cells can have the same cell state and different roles, so in the event of a contradiction a different cell state is assigned to the latter cell.

The cell states for each cell may be determined in a zig-zag sequence. The sequence ends at the corner of the automata that has only boundary values as inputs, starts at its diametrically opposite corner and traverses the automata until it reaches a boundary before reversing direction on a new diagonal.

The invention may also include a novel application of multiplexers that will respond to any given permanent cell failure with a lateral displacement of inputs and outputs of the cells on its row. This ensures that the automata platform can replace one cell in every row with an unused cell on the same row.

The method may respond to more than one cell failure on the same row, requiring an impossible lateral displacement of two cells, with a vertical displacement of inputs and outputs. This ensures an automata platform can replace entire rows of faulty cells with unused rows of cells on the automata.

BRIEF DESCRIPTION OF THE DRAWINGS

Embodiments of the present invention will now be described, by way of example only, with reference to the accompanying drawings:

FIG. 1: An abstract diagram of a convergent cellular automaton;
FIG. 2: An example logic executed by each cell;
FIG. 3: An example set of rules used by each cell to determine its state;
FIG. 4: The rules of FIG. 3 repairing a four-by-four cellular automaton;
FIG. 5: An alternative logic embodiment to FIG. 2;
FIG. 6: The bitstream packet used to configure FIG. 5;
FIG. 7: The design algorithm for generating the necessary cell state assignments and the rules that determine them;
FIG. 8: The iteration route for FIG. 7;
FIG. 9: An example embodiment of cell routing management;
FIG. 10: An example four-by-four array of the cells shown in FIG. 9;
FIG. 11: An abstract diagram of the array of FIG. 10 replacing 1 broken cell; and
FIG. 12: An abstract diagram of the array of FIG. 10 replacing 2 broken cells on the same row.

DETAILED DESCRIPTION OF THE INVENTION

Referring to FIG. 1, a convergent cellular automata architecture is assembled from large numbers of small "cells" (a), computing units that self-determine their purpose within the array based on the purpose of two of their adjoining, non-facing neighbours, e.g. (b,c).

FIG. 2 shows the logic responsible for determining the "state" of the cell, which in turn determines the function of the cell within the array. Each cell obeys an identical set of rules in this determination, pre-designed by the application of the algorithm in FIG. 7 and pre-programmed into the state look-up table (FIG. 2) of every cell.

Because the state of the automata as a whole at time n can be expressed as (1):

$$f^n(C_0) = \sum_{A_m \mid A, D_m \mid D} A_m^n \cdot C_0 + \left( \frac{I - A_m^{n-1}}{I - A_m} \right) \cdot D_m \quad (1)$$

Where every element of the set of matrices A is either upper-diagonal or lower-diagonal, the state of the automata will converge to the array form:

$$C_\infty = \lim_{n > \sqrt{\text{width}(A) * \text{height}(A)}} \sum_{A_m \in A} \frac{I}{I - A_m} \cdot \overline{D_m} \quad (2)$$

repairing any dynamic faults.

The transition function f( ) of equation (1) is equivalent to any possible look-up table operation represented as a sum of products. This corresponds to the look-up table used by every cell to self-determine its state. The design of the look-up table determines the configuration that the automata will converge to.

Referring to FIG. 3, an example look-up table and FIG. 4, a four-by-four automata with correct states (c) and the sequence (d) by which it corrects transient faults. Because the look-up table takes inputs from adjoining cells above and to the left of it, the origin-cell (a) is the top-left corner cell and the terminus-cell (b) is the bottom-right corner cell. In the event of a fault in the states occurring in any combination of cells, the cells between the fault and the terminus will determine their state based on incorrect inputs; but the cells that are in fault will determine their state based on correct inputs, thus correcting the fault. After repeated application of this repair cycle the automata will be without fault again (e).

Referring to FIG. 2, an embodiment of the logic responsible for determining the function the cell will apply to its data inputs. The state of the cell must map to a data function, in the form of a bitstream written to a look-up table and executed. This mapping is a many-to-one mapping, that is, more than one state can map to the same data function. Every bitstream required for the automata is stored in the function look-up table of description. The bitstream is selected by the output of the configuration look-up table.

This bitstream is then loaded into the execution look-up table. Every time the cell configuration changes (as detected by the cell comparator), the execution look-up table is reloaded with a new bitstream.

By default, the cell inputs at the bounds of the array are zero. A complete system reload can be triggered by changing the boundary inputs to another value, then returning them to zero at the next clock cycle.

Normally an automata is designed to perform one function. If instead the input states provided to the cells on the bounds of the array are globally determined instead of tied to zero, the array will re-configure itself to a new function every time the boundary conditions change.

Each program change requires t clock cycles to change to, where t is determined by:

$$t = \sqrt{\text{width}(A) * \text{height}(A)} + \text{size}(\text{execution } LUT) \quad (3)$$

Each function change is triggered by changing the boundary values. This prompts a change of state for all the cells of the array such that the automata state formation will converge to a new function that the transition rule was designed for. After t clock cycles the function is ready to be executed.

Referring to FIGS. 5 and 6, an alternative embodiment to the logic responsible for determining the function the cell will apply to its data inputs. The function look-up table is replaced with internal cell logic and an externally stored program that is perpetually transmitted to each cell serially via the 'program' line. Each bitstream required for the automata is prefixed with a header packet that corresponds to a cell state. The cell compares the bitstream header with its own state and, if they match, loads the execution look-up table with the bitstream that follows.

Referring to FIG. 7, a design algorithm for the cellular automata platform. The difficulties of designing a cellular automaton to converge to a particular fixed configuration, $C_\infty$ have so far prevented their use in the aforementioned manner. The algorithm in FIG. 7 only works for the automata platform shown in FIG. 1.

The function of the array is first divided up into a collection of locally linked components that can be implemented on look-up tables. In order for each cell to derive its function from the state from its immediate neighbours a list of rules that relates one to the other is needed. It is the state-of-neighbours to cell-state mapping and the cell-state to cell-function mapping that needs to be programmed in each cell.

The fewer states necessary for the configuration of the array, the less memory and logic is required, and interconnecting busses can be smaller. Thus the algorithm attempts to minimize the number of necessary states.

The design algorithm starts with no assigned state. The assignation of such states to each cell starts by testing pre-assigned states to the problem before using a new state. Each state assignment is tested against two possible conflicts:

The combination of cell state inputs must be a one-to-one mapping to the state of the cell. That is, if one cell has inputs {1,2} which maps to a cell state {3}, another cell cannot have the same {1,2} inputs map to a different cell state, {4};

The cell state must be a many-to-one mapping to the function of the cell. That is, the cell state {1} cannot map to both functions {A} and {B}; however more than one cell state can map to the same function 1.

Referring to FIG. 8, the algorithm generates the interaction rules and state assignments for each cell in a zig-zag sequence. The sequence ends at the corner of the automata that has two boundary values as inputs, the terminus cell, and starts at its diametrically opposite corner, the origin cell, and traverses the automata until it reaches a boundary before reversing direction on a new diagonal. Thus if the inputs for each cell come from above and to the left, the sequence starts in the bottom-right corner, ends in the top-left corner and ascends in the sequence shown in FIG. 7.

Referring to FIGS. 9 and 10, the cell logic responsible for repairing permanent faults. Each cell has 6 inputs:

w(1) in: is the effective data and configuration busses from the output of the cell immediately to the north of itself, however it has been routed via the cell to the west.

w(2) in: is the data and configuration busses from the output of the cell immediately to the west of itself. If the cell is on the west edge of the array, these inputs are 0.

ne in: is the data and configuration busses from the north-east cell which have been routed from the cell to the north. In the event of the cell to west detecting a fault its northern input will be rerouted to this cell.

clk: this is a global input responsible for synchronising the operations of each cell.

cntrl: is a global input responsible for co-ordinating cell operations, primarily self-test and cell programming upon startup.

program: is a global input that, upon start-up carries the program used to program the cell logic.

Each cell has 3 outputs:

sw out: is the data and configuration busses from this cell to the cell to the south-west. During normal operation this will be re-routed to the cell to the south of this cell.

e(1) out: is the data and configuration busses from the output of the cell to the north-east of this cell.

e(2) out: is the data and configuration busses from the output of this cell.

A permanent fault that can be fixed by this architecture will meet the following criteria:

The built-in self-test unit of the cell is still operating.

The fault is detectable by the built-in self-test unit.

The multiplexers (cell (a) of FIG. 1) responsible for re-routing are still operating.

Referring to FIG. 11, in the event of a permanent fault being detected the multiplexers will respond with a lateral displacement of inputs and outputs of the cells on its row to the right of itself. The array will use a previously unused cell on the row as a replacement for the dead cell. The routing operates such that, from the perspective of each cell, the array is still regular. The change in connections automatically triggers a new calculation of cell state and assigned cell function by each cell shifted by the operation.

Referring to FIG. 12, in the event of more than one cell on the same row being subject to permanent faults, the multiplexers will respond with a vertical displacement of inputs and outputs, in effect making the row transparent. The routing operates such that, from the perspective of each cell, the array is still regular. The change in connections automatically triggers a new calculation of cell state and assigned cell function by each cell shifted by the operation.

The present invention achieves a robust behaviour that is the result of an architecture that is itself intrinsically robust. The result is a parallel processing system that can sustain performance during operation in a hostile environment. Subject to dynamic faults in every cell, the system will repair itself. Subject to permanent faults, the system will attempt to repair itself within the limits of available redundant cells. The platform is reprogrammable, and a design algorithm specific to this platform is provided for this purpose.

While the above descriptions contain many specificities, these should not be construed as limitations on the scope of the invention, but rather as exemplifications of embodiments thereof.

The invention claimed is:

1. A data processing apparatus, comprising
a plurality of first data processing cells, wherein
(i) each said first data processing cell is adapted to store data corresponding to a state value representing a property of the cell,
(ii) the apparatus is adapted to repeatedly update the state value of each said first data processing cell in dependence on the respective state value of at least one predetermined other said first data processing cell, in accordance with a first set of rules,
(iii) each cell follows the same said first set of rules, and
(iv) the first set of rules is determined by predetermined final state values of a plurality of said first data processing cells, such that repeated updates of the state values of the plurality of first data processing cells cause the state values of said plurality of first data processing cells to converge towards said predetermined final state values, independently of the initial state values of said first data processing cells.

2. An apparatus according to claim 1, wherein the respective state value of a plurality of said first data processing cells is updated independently of the state value of said each cell.

3. An apparatus according to claim 1, wherein two or more said first and/or second data processing cells are adapted to have the same state value.

4. An apparatus according to claim 1, wherein
the respective state value of a plurality of said first data processing cells is updated in accordance with a respective output state value obtained by applying the first set of rules to one or more input state values of respective predetermined other said first and/or second data processing cells,
wherein one configuration of input state values always determines the same output state value, and
wherein two or more different configurations of input state values determine the same output state value.

5. An apparatus according to claim 1, wherein a plurality of said first and/or second said data processing cells are adapted to communicate only with adjacent cells.

6. An apparatus according to claim 1, wherein a plurality of said first and/or said second data processing cells are identical to each other.

7. An apparatus according to claim 1, wherein said first and/or second data processing cells are interconnected in an array.

8. An apparatus according to claim 7, wherein the array is a planar rectangular array.

9. An apparatus according to claim 1,
wherein a plurality of said first data processing cells are interconnected in rows, wherein a plurality of said rows each comprise at least one unused cell, and
wherein, in the event of failure of a said cell, the inputs and outputs of a plurality of cells in that row are displaced along the row to activate at least one said unused cell.

10. An apparatus according to claim 1,
wherein a plurality of said first data processing cells are interconnected in rows, and at least one said row comprises a row of unused cells, and
wherein, in the event of failure of a said cell in one row, the inputs or outputs of the cells in that row are shifted to the next row.

11. An apparatus according to claim 9, wherein the inputs and outputs of cells are shifted by means of multiplexers.

12. A data processing method executed by a data processing apparatus according to claim 1, the method comprising repeatedly updating the state value of each of a plurality of said first data processing cells in dependence on the respective state value of at least one predetermined respective other said first data processing cell, in accordance with a first set of rules, wherein each cell follows the same said first set of rules, and the first set of rules is determined by predetermined final state values of a plurality of said first data processing cells, such that repeated updates of the state values of the plurality of first data processing cells causes the state values of said plurality of first data processing cells to converge towards said predetermined final state values, independently of the initial state values of said first data processing cells.

13. A method according to claim 12, wherein a plurality of said first data processing cells are interconnected in rows, a plurality of said rows each comprise at least one unused cell, and the method further comprises, in the event of failure of a said cell, displacing the inputs and outputs of a plurality of cells in that row along the row to activate at least one said unused cell.

14. A method according to claim 12, wherein a plurality of said first data processing cells are interconnected in rows, at least one said row comprises a row of unused cells, and the method further comprises, in the event of failure of a said cell in one row, shifting the inputs or outputs of the cells in that row to the next row.

15. An apparatus to carry out a method according to claim 12, the apparatus comprising eighth computer code for repeatedly updating the state value of each of a plurality of said first data processing cells in dependence on the respective state value of at least one predetermined respective other said first data processing cell, in accordance with a first set of rules, wherein each cell follows the same said first set of rules, and the first set of rules is determined by predetermined final state values of a plurality of said first data processing cells, such that repeated updates of the state values of the plurality of first data processing cells causes the state values of said plurality of first data processing cells to converge towards said predetermined final state values, independently of the initial state values of said first data processing cells.

16. An apparatus according to claim 15, wherein a plurality of said first data processing cells are interconnected in rows, wherein a plurality of said rows each comprise at least one unused cell, and the computer program product further comprises twentieth computer code for displacing the inputs and outputs of a plurality of cells in that row along the row to activate at least one said unused cell, in the event of failure of a said cell.

17. An apparatus according to claim 15, wherein a plurality of said first data processing cells are interconnected in rows, and at least one said row comprises a row of unused cells, and the computer program product further comprises twenty first computer code for shifting the inputs or outputs of the cells in that row to the next row, in the event of failure of a said cell in one row.

18. A method of configuring a data processing apparatus according to claim 1, the method comprising:
assigning a state value to a first data processing cell of the apparatus;
testing the state value of said cell, and the respective state value of each other said first data processing cell in dependence on which the state value of said cell is adapted to be repeatedly updated, against previously determined rules; and
if a previously determined rule updates the cell to a different state value based on the state values of the other cells, assigning a different state value to said cell.

19. A method according to claim 18, wherein a new state value is assigned to a cell only after all state values previously assigned to other cells have been unsuccessfully tested.

20. An apparatus to carry out a method according to claim 18, the apparatus comprising:
first computer code for assigning a state value to a first data processing cell of the apparatus;
second computer code for testing the state value of said cell, and the respective state value of each other said first data processing cell in dependence on which the state value of said cell is adapted to be repeatedly updated, against previously determined rules; and
third computer code for assigning a different state value to said cell if a previously determined rule updates the cell to a different state value based on the state values of the other cells.

21. An apparatus according to claim 20, further comprising sixth computer code for assigning a new state value to a cell only after all state values previously assigned to other cells have been unsuccessfully tested.

* * * * *